United States Patent
Kang et al.

(10) Patent No.: US 12,103,861 B2
(45) Date of Patent: Oct. 1, 2024

(54) METHOD FOR PREPARING CATHODE ACTIVE MATERIAL

(71) Applicant: KOREA UNIVERSITY RESEARCH AND BUSINESS FOUNDATION, Seoul (KR)

(72) Inventors: Yong-Mook Kang, Seoul (KR); Suwon Lee, Seoul (KR); Youngju Choi, Seoul (KR); Gi-Hyeok Lee, Cheonan-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 273 days.

(21) Appl. No.: 17/570,084

(22) Filed: Jan. 6, 2022

(65) Prior Publication Data
US 2022/0220003 A1 Jul. 14, 2022

(30) Foreign Application Priority Data
Jan. 8, 2021 (KR) .................. 10-2021-0002448

(51) Int. Cl.
*H01M 4/50* (2010.01)
*C01G 45/12* (2006.01)
*H01M 4/02* (2006.01)

(52) U.S. Cl.
CPC ...... *C01G 45/1228* (2013.01); *C01P 2002/72* (2013.01); *C01P 2002/82* (2013.01); *C01P 2002/88* (2013.01); *C01P 2006/40* (2013.01); *H01M 2004/028* (2013.01); *H01M 4/50* (2013.01)

(58) Field of Classification Search
CPC .............. H01M 4/50; H01M 2004/028; C01G 45/1228
See application file for complete search history.

(56) References Cited

U.S. PATENT DOCUMENTS

2013/0134362 A1   5/2013   Kim et al.

FOREIGN PATENT DOCUMENTS

| CN | 105439206 | * | 4/2017 | ......... C01G 45/1242 |
| JP | 2000-34127 A | | 2/2000 | |
| JP | 2009-64731 A | | 3/2009 | |
| JP | 2010-108912 A | | 5/2010 | |
| KR | 10-1268501 B1 | | 6/2013 | |

(Continued)

OTHER PUBLICATIONS

Jiang, et al. "Poly(vinyl pyrrolidone)-assisted hydrothermal synthesis of LiMn2O4 nanoparticles with excellent rate performance," Materials Letters, 2013, 91, 12-15 (Year: 2013).*

(Continued)

*Primary Examiner* — Anthony J Zimmer
*Assistant Examiner* — Eric Scott Sherman
(74) *Attorney, Agent, or Firm* — Hauptman Ham, LLP

(57) ABSTRACT

The inventive concept discloses a method for preparing a cathode active material containing a lithium manganese oxide exhibiting a reversible phase transition, and exhibiting electrochemical characteristics of the lithium manganese oxide through the reversible phase transition including (A) synthesizing a sodium manganese oxide using a manganese precursor, and (B) reacting the sodium manganese oxide with a lithium precursor to synthesize the lithium manganese oxide, or including (C) directly synthesizing the lithium manganese oxide.

4 Claims, 7 Drawing Sheets

(56) References Cited

FOREIGN PATENT DOCUMENTS

| KR | 10-2015-0069334 A | 6/2015 | | |
|---|---|---|---|---|
| KR | 10-2091214 B1 | 3/2020 | | |
| KR | 10-2112405 B1 | 5/2020 | | |
| KR | 10-2116005 B1 | 5/2020 | | |
| WO | WO2000076921 | * | 12/2000 | ............ H01M 4/131 |

OTHER PUBLICATIONS

Feng, et al., "Hydrothermal Soft Chemical Synthesis of Tunnel Manganese Oxides with Na+ as Template," Chemistry Letters 2000 29:3, 284-285 (Year: 2000).*

Tokura, et al., "Ultrasensitive Detection of Methylmercaptan Gas Using Layered Manganese Oxide Nanosheets with a Quartz Crystal Microbalance Sensor," Analytical Chemistry, 2017, 89 (22), 12123-12130 (Year: 2017).*

Mi Ru Jo et al., "Triggered reversible phase transformation between layered and spinel structure in manganese-based layered compounds," Nature Communications, Sep. 2, 2019, vol. 10, Article No. 3385.

Notice of Allowance issued on Dec. 29, 2022, for corresponding Korean Patent Application No. 10-2021-0002448, along with an English machine translation (2 pages).

* cited by examiner

METHOD FOR PREPARING CATHODE ACTIVE MATERIAL

STATEMENT REGARDING GOVERNMENT SPONSORED RESEARCH OR DEVELOPMENT

The inventive concept is derived from research conducted as part of personal basic research (Ministry of Science and ICT) (R&D) (Project Identification Number: 1711111832, Research Management Institution: National Research Foundation of Korea, Research Project Title: Search and research on new electrode material based on complementary complex method and anion oxidation/reduction, Host Institution: Korea University Industry-University Cooperation Foundation, Research Period: 2020.03.01~2021.02.28, Contribution Rate: 1/2) of the Ministry of Science and ICT.

CROSS-REFERENCE TO RELATED APPLICATIONS

A claim for priority under 35 U.S.C. § 119 is made to Korean Patent Application No. 10-2021-0002448 filed on Jan. 8, 2021, in the Korean Intellectual Property Office, the entire contents of which are hereby incorporated by reference.

In addition, the inventive concept is derived from research conducted as part of Future Material Discovery (R&D) (Project Identification Number: 1711121529, Research Management Institution: National Research Foundation of Korea, Research Project Title: Development of 3D cathode for metal-air battery with maximized reaction interface based on digital twin technology, Host Institution: Korea University Industry-University Cooperation Foundation, Research Period: 2020.08.31~2024.12.31, Contribution Rate: 1/2) of the Ministry of Science and ICT.

There is no property interest of the Korean government in any aspect of this invention.

BACKGROUND

Embodiments of the inventive concept described herein relate to a method for preparing a cathode active material.

Batteries are devices that stores electrical energy in a form of chemical energy. Among them, a secondary battery has reversible charging/discharging characteristics, and includes an electrode, an electrolyte, and a separator.

Among them, the electrode that mainly contributes to an electrochemical characteristic of the secondary battery is composed of an anode and a cathode, and contains an active material for electrochemical activity.

Among various types of the secondary batteries, a lithium secondary battery containing a lithium-based material as a cathode active material has high energy density, no memory effect, and low self-discharge, so that the lithium secondary battery is widely utilized as an energy storage device for a portable electronic device.

However, as devices, such as an electric vehicle, requiring various electrochemical characteristics such as an energy density, a lifespan, and the like higher than those of existing device requiring energy storage appear, research on an electrode active material superior to $LiCoO_2$ and carbon-based graphite, which were commercialized as cathode and anode active materials, is being actively conducted.

SUMMARY

Embodiments of the inventive concept provide a method for preparing a cathode active material that exhibits excellent capacity and lifespan characteristics by making a structural change that appears during charging/discharging to be reversible.

In one example, the technical problems to be achieved in the inventive concept are not limited to the technical problems mentioned above. Other technical problems not mentioned will be clearly understood by those of ordinary skill in the art to which the inventive concept belongs from a following description.

According to an exemplary embodiment, a method for preparing a cathode active material includes (A) synthesizing a sodium manganese oxide using a manganese precursor, and (B) reacting the sodium manganese oxide with a lithium precursor to synthesize a lithium manganese oxide.

The manganese precursor may be formed as a precursor containing sodium, and the step (A) may include synthesizing the sodium manganese oxide by a hydrothermal synthesis in distilled water or a microwave process of the manganese precursor.

The manganese precursor may be formed as a Mn (II) precursor, and the step (A) may include synthesizing the sodium manganese oxide by mixing the manganese precursor, an ethylenediamine tetraacetic acid (EDTA) disodium salt, and distilled water with each other to form a mixture, and then, adding a NaOH aqueous solution to the mixture.

The step (B) may include preparing the lithium manganese oxide by performing ion-exchange between sodium and lithium of the sodium manganese oxide in an aqueous lithium precursor solution.

The lithium manganese oxide prepared in the step (B) may be expressed by a following [Chemical Formula 1].

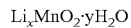
$Li_xMnO_2 \cdot yH_2O$     [Chemical Formula 1]

(here, 0.23≤x≤1, and 0.01≤y≤0.5.)

According to another exemplary embodiment, a method for preparing a cathode active material includes (C) synthesizing a lithium manganese oxide through a room temperature synthesis or a hydrothermal synthesis using an oxidizing/reducing agent or a chelating agent of lithium and a manganese precursor.

A cathode active material containing the lithium manganese oxide may exhibit a reversible phase transition during charging/discharging.

A cathode active material containing the lithium manganese oxide may have an initial capacity in a range from 250 to 285 mAh/g when charging/discharging is performed at a current density of 0.1 C in a voltage range from 1.5 V to 4.8 V by a reversible phase transition, and the cathode active material containing the lithium manganese oxide may have a capacity reduction rate after 20 times of the charging/discharging higher than 0% and lower than 5%.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 3 shows a charging state, and FIG. 4 shows a discharging state;

DETAILED DESCRIPTION

Figure 1:
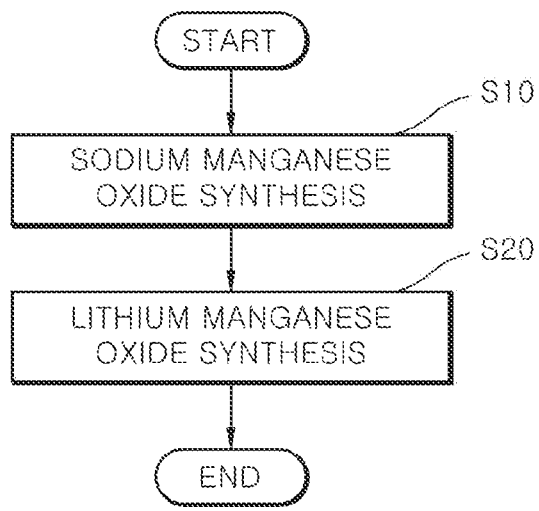
FIG. 1 is a flowchart showing a method for manufacturing a cathode active material according to an embodiment of the inventive concept.

Hereinafter, embodiments of the inventive concept will be described in more detail with reference to the accompanying drawings. The embodiments of the inventive concept may be modified in various forms, and the scope of the inventive concept should not be construed as being limited to the following embodiments. The present embodiment is provided to more completely describe the inventive concept to those of ordinary skill in the art. Accordingly, shapes of elements in the drawings are exaggerated to emphasize a clearer description.

Components of the inventive concept for clarifying solutions to the problems to be solved by the inventive concept will be described in detail with reference to the accompanying drawings based on preferred embodiments of the inventive concept. In assigning reference numerals to the components of the drawings, the same reference numbers are given to the same components even when the components are in different drawings. It should be noted in advance that components of other drawings may be cited when necessary in the description of the corresponding drawing.

Among various kinds of cathode active materials, a layered structure-based material is being actively studied in recent years because the layered structure-based material is able to achieve a high energy density required in a field such as an electric vehicle with a high theoretical capacity and an average voltage thereof. However, the high theoretical capacity, which is an advantage of the layered structure-based material, has been considered an unattainable goal due to an irreversible structural change or the like that occurs when an amount of desorption of alkali ions increases. An existing solution is to replace a transition metal, which is a center of oxidation/reduction, or to delay the irreversible structural change through doping of a metal element with high affinity for oxygen.

In general, the layered structure-based cathode active material is composed of an alkali metal (Li, Na, K, and the like) layer as a charge transfer medium and a transition metal oxide layer. In this connection, when the alkali metal in the transition metal oxide layer escapes at a rate equal to or higher than a certain rate, a layered structure is not able to be maintained thermodynamically, and thus, the structure is changed. The structure formed as such is thermodynamically more stable than the existing layered structure, so that the structure has irreversibility of not being able to be returned to the existing layered structure.

Such irreversible structural change is not able to be completely prevented even with the above solution. Therefore, it has been considered impossible to fully utilize the high theoretical capacity of the layered structure-based material.

The inventive concept is to induce a reversible structural change using crystal water inserted into a manganese-based metal oxide layer to realize an electrochemical characteristic close to the theoretical capacity of the layered structure-based material and maximize charging/discharging reversibility.

FIG. 1 is a flowchart showing a method for manufacturing a cathode active material according to an embodiment of the inventive concept.

Referring to FIG. 1, a method for manufacturing a cathode active material according to an embodiment of the inventive concept may include a sodium manganese oxide synthesis step (S10) and a lithium manganese oxide synthesis step (S20).

In the inventive concept, the sodium manganese oxide synthesis step (S10) may be performed in two processes.

In the sodium manganese oxide synthesis step (S10), in a first process, a sodium manganese oxide may be synthesized by a hydrothermal synthesis in distilled water or a microwave process of a manganese precursor containing sodium.

In addition, in the sodium manganese oxide synthesis step (S10), in a second process, a manganese (Mn (II)) precursor containing the crystal water in a crystal structure is mixed with an ethylenediamine tetraacetic acid (EDTA) disodium salt in the distilled water, and then, an aqueous NaOH solution is gradually added to the mixed solution to synthesize the sodium manganese oxide.

In one example, in the sodium manganese oxide synthesis step (S10), after washing the sodium manganese oxide obtained by the first process or the second process with the distilled water, the sodium manganese oxide may be dried in a vacuum atmosphere to remove residual moisture.

In one example, a specific process will be described later in [Example] below.

In addition, in the inventive concept, the lithium manganese oxide synthesis step (S20) may be performed in two processes.

In the lithium manganese oxide synthesis step (S20), in a first process, a lithium manganese oxide may be synthesized by reacting the sodium manganese oxide synthesized in the sodium manganese oxide synthesis step (S10) (the first process or the second process) with an aqueous lithium precursor solution to induce ion-exchange between sodium and lithium.

That is, because manganese exists as Mn (II), (III), and (IV) in birnessite, the synthesis method for oxidizing the Mn (II) precursor (the second process) or reducing the Mn precursor (the first process) is used.

In this connection, because of reactivity of the lithium manganese oxide of a birnessite structure, the sodium manganese oxide may be synthesized first, and then, the lithium manganese oxide may be obtained by reacting the synthesized manganese oxide with the aqueous lithium solution as the precursor.

In addition, direct synthesis of reacting the manganese precursor with the lithium precursor without using the sodium in the process of oxidation/reduction may be performed.

In one example, a specific process will be described later in [Example] below.

The lithium manganese oxide prepared through the sodium manganese oxide synthesis step (S10) and the lithium manganese oxide synthesis step (S20) may be expressed by a following [Chemical Formula 1].

$Li_xMnO_2 \cdot yH_2O$ [Chemical Formula 1]

(here, 0.23≤x≤1, and 0.01≤y≤0.5.)

That is, the cathode active material according to an embodiment may be Li-birnessite containing the crystal water and exhibiting a two-dimensional layered crystal structure.

In the following, with reference to FIGS. 2 to 4 together, a cathode active material, which is prepared in the method for preparing the cathode active material according to an embodiment of the inventive concept, exhibits the two-dimensional layered crystal structure, and is the lithium-birnessite, will be described.

Figure 2:
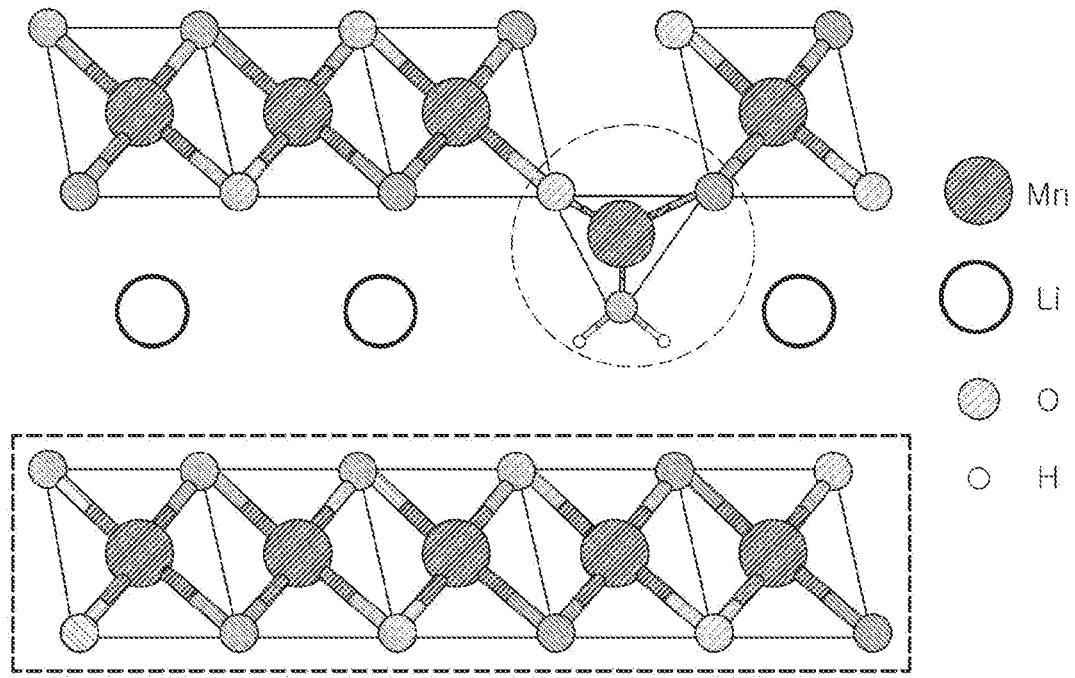
FIG. 2 is an exemplary diagram showing two different crystal structures in a cathode active material prepared in a method for preparing a cathode active material according to an embodiment of the inventive concept.

FIG. 2 is an exemplary diagram showing two different crystal structures in a cathode active material prepared in a method for preparing a cathode active material according to an embodiment of the inventive concept. FIGS. 3 and 4 are exemplary views showing a crystal structure change during charging/discharging of a cathode active material prepared in a method for preparing a cathode active material according to an embodiment of the inventive concept, FIG. 3 shows a charging state, and FIG. 4 shows a discharging state.

The cathode active material prepared in the preparing method described above is a manganese-based metal oxide containing the crystal water, and is able to exhibit a reversible phase transition of returning to an original structure during discharging as a structural change to a metastable phase instead of a stable phase is induced by the crystal water properly contained in the crystal structure before the irreversible structural change occurs completely.

The corresponding cathode active material may contain the crystal water and the manganese-based metal oxide. As shown in FIG. 2, the manganese-based metal oxide may have a two-dimensional crystal structure (a dotted square portion in FIG. 2) in which a unit lattice structure in which manganese (Mn) and oxygen (O) are bonded to each other is extended two-dimensionally, and may have a three-dimensional crystal structure (a dotted circle portion in FIG. 2) as manganese (Mn) in the manganese-based metal oxide is bonded with oxygen (O) in the crystal water.

Hereinafter, in one embodiment, for convenience, a phase having the two-dimensional crystal structure is referred to as a first crystal phase, and a phase having the three-dimensional crystal structure is referred to as a second crystal phase.

First, the first crystal phase has the two-dimensional crystal structure (a layered crystal structure) composed of the manganese-based metal oxide. In one embodiment, in the unit lattice of the two-dimensional crystal structure, the manganese fills octahedral sites of the unit lattice.

The two-dimensional crystal structure may again include two or more unit layers made of a manganese oxide, and may contain a lithium (Li) element disposed between the two or more unit layers.

The lithium (Li) element may be repeatedly inserted into or desorbed from a space between the two or more unit layers during a charging/discharging process to repeatedly oxidize/reduce the manganese (Mn). Specifically, in the discharging process of the cathode active material according to an embodiment, the lithium (Li) element may be inserted into the space between the unit layers. In addition, in the charging process of the cathode active material, the lithium (Li) element may be desorbed from the space between the unit layers.

That is, the lithium (Li) element serves to induce electrochemical activity of the manganese (Mn) while going in and out of the space between the two or more unit layers.

In one embodiment, the crystal water may be further disposed between the two or more unit layers. That is, the crystal water may be disposed between the two or more unit layers together with the lithium (Li) element.

In one example, the crystal water may exist between the two or more unit layers. Unlike the lithium (Li) element, the crystal water may remain in the space between the two or more unit layers without being desorbed. Accordingly, even when the lithium (Li) element is repeatedly inserted into or desorbed from the space between the two or more unit layers, an arrangement of the unit layers may be continuously maintained without collapsing.

In one example, the crystal water according to an embodiment may form the chemical bonding with the manganese (Mn) as described above. In one embodiment, the chemical bonding between the crystal water and the manganese may proceed reversibly based on the charging/discharging. Specifically, in the charging process of the cathode active material according to an embodiment, bonding between the manganese (Mn) and oxygen constituting the unit layer is broken, and the lithium (Li) element is desorbed out of the unit layer. In this connection, the manganese (Mn) whose bonding is broken is bonded with the oxygen in the crystal water to form the three-dimensional crystal structure.

On the other hand, in the discharging process of the cathode active material, the bonding between the oxygen of the crystal water and the manganese (Mn) is broken, and the manganese (Mn) whose bonding is broken is recombined with the oxygen constituting the unit layer.

That is, in one embodiment, the second crystal structure forming reaction by the bonding between the oxygen in the crystal water and the manganese and the first crystal structure forming reaction by the bonding between the oxygen constituting the unit layer and the manganese (Mn) may be in a mutually reversible relationship.

The phenomenon in which the formation reactions of the first crystal structure and the second crystal structure are mutually reversible as described above is resulted from a difference in thermodynamic stability between the bonding between the oxygen in the crystal water and the manganese (Mn) and the bonding between the oxygen constituting the unit layer and the manganese (Mn).

In one embodiment, the first crystal phase formed through the bonding between the oxygen constituting the unit layer and the manganese (Mn) is a thermodynamically stable phase. However, the second crystal phase formed through the bonding between the oxygen in the crystal water and the manganese (Mn) is a thermodynamically metastable phase.

Accordingly, in the cathode active material according to an embodiment, the first crystal phase, which is the stable phase, may be changed to the second crystal phase, which is the metastable phase, by external energy in a charging state, and the second crystal phase, which is the metastable phase, may be changed to the first crystal phase, which is the stable phase in a discharging state.

In one embodiment, the second crystal phase has the three-dimensional crystal structure as described above, and is the thermodynamically metastable phase.

When the second crystal phase is included within the above range in an initial state of the cathode active material according to an embodiment, even when the number (cycles) of charging/discharging of the cathode active material is increased, the reversible phase transition relationship between the first crystal phase and the second crystal phase may be maintained.

The second crystal phase according to an embodiment may have the three-dimensional crystal structure as described above. In a unit lattice of the three-dimensional crystal structure, the manganese may fill octahedral sites and tetrahedral sites of the unit lattice. That is, the number of bonding with the oxygen of the manganese in the unit lattice of the two-dimensional crystal structure and the manganese in the unit lattice of the three-dimensional crystal structure may be different.

In one embodiment, an arrangement relationship of the manganese and the oxygen in the unit lattice of the three-dimensional crystal structure is similar to that of a spinel crystal structure having the manganese as a central element. However, unlike the general spinel crystal structure having 6 oxygen atoms bonded to one manganese (Mn) atom, in the three-dimensional crystal structure according to an embodiment, 4 oxygen atoms may be bonded to one manganese (Mn) or 6 oxygen atoms may be bonded to one manganese (Mn) in the unit lattice.

The general spinel crystal structure is thermodynamically stable and exhibits irreversible characteristic. When the layered structure undergoes a phase transition to the thermodynamically stable spinel crystal structure during the charging, a content of the spinel crystal structure gradually increases by repeated charging/discharging. Because the spinel crystal structure has a lower theoretical capacity compared to the layered structure, a capacity and a lifespan of the cathode active material may be significantly reduced.

Therefore, a general cathode active material for a secondary battery not only should be adjusted not to contain a material having such a spinel crystal structure, but also should be adjusted such that the material having the spinel crystal structure is not formed in the repeated charging/discharging states.

In the general cathode active material for the secondary battery, the spinel crystal structure is formed in the process of charging to high voltage, so that the charging/discharging is performed by lowering the voltage to prevent the formation of the spinel crystal structure. As the charging/discharging driving is performed by lowering the voltage as such, it was inevitable to exhibit a lower capacity than the theoretical capacity of the cathode active material.

However, in the cathode active material according to an embodiment, because the first crystal phase and the second crystal phase have the mutually reversible phase transition relationship, even when the charging/discharging is repeated at the high voltage, excellent capacity characteristics close to the theoretical capacity and excellent lifespan characteristics may be exhibited at the same time through the reversible phase transition that forms the second crystal phase, which is the thermodynamically metastable phase, by bonding the manganese with the oxygen in the crystal water.

In one example, the first crystal phase and the second crystal phase may be mixed in the cathode active material according to an embodiment, as shown in FIG. 2. However, because the first crystal phase and the second crystal phase have different dimensions, even when the first crystal phase and the second crystal phase are mixed in the cathode active material, an overall microstructure may be different depending on contents of the first crystal phase and the second crystal phase.

That is, when one region of the cathode active material is selected, a microstructure in the corresponding region exhibits a microstructure corresponding to a crystal phase having a higher content among the first crystal phase and the second crystal phase.

The cathode active material is synthesized through oxidation and reduction of a manganese precursor. Various methods such as microwave, hydrothermal, and room temperature synthesis are used, and an oxidation/reduction agent, a hydrogen concentration index, and a chelating agent the required are required in each synthesis environment are used.

Figure 3:
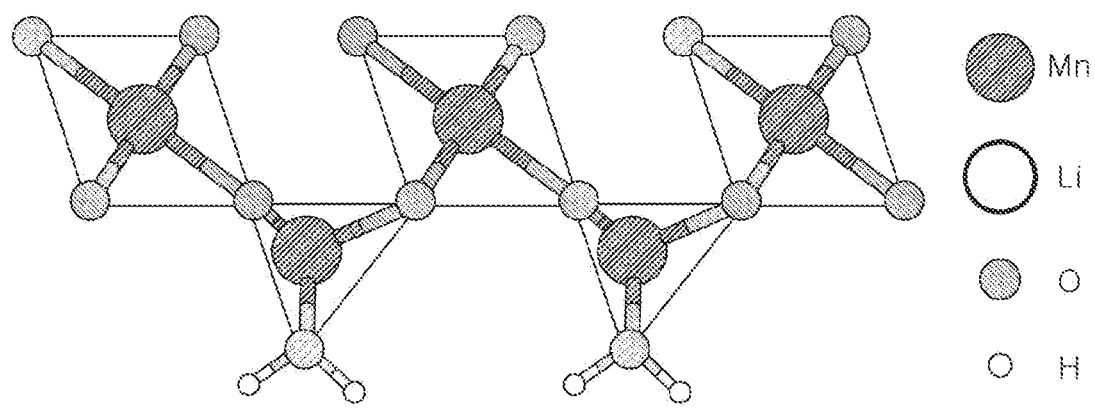
FIGS. 3 and 4 are exemplary views showing a crystal structure change during charging/discharging of a cathode active material prepared in a method for preparing a cathode active material according to an embodiment of the inventive concept.
Figure 4:
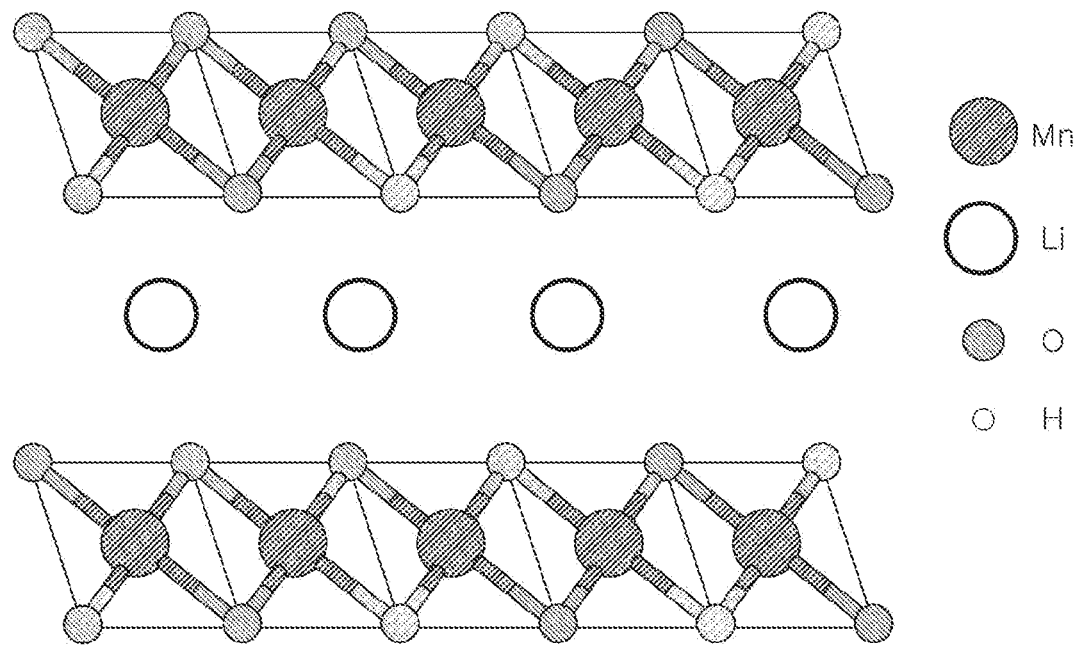

In addition, referring to FIGS. 3 and 4, the cathode active material according to FIG. 2 is in the initial state without being charged/discharged. In the cathode active material according to an embodiment, as the charging and the discharging are performed once, the internal crystal structure is sequentially changed in an order of FIGS. 2, 3, and 4.

In addition, when the charging/discharging is repeated for the cathode active material whose discharging has been completed, the cathode active material becomes to exhibit the internal crystal structures in FIGS. 3 and 4 repeatedly.

Referring to FIG. 3 first, in the charging state of the cathode active material according to an embodiment, the first crystal phase is reduced and the second crystal phase is formed. Specifically, in the charging state of the cathode active material, at least some of the manganese (Mn) in the manganese-based metal oxide migrates from the two-dimensional layered crystal structure and becomes somewhat thermodynamically unstable compared to the two-dimensional layered crystal structure, and a reaction in which the migrated manganese (Mn) is combined with the oxygen (O) in the crystal water predominantly proceeds. Therefore, as the charging proceeds, the content of the second crystal phase in the cathode active material gradually increases.

On the other hand, referring to FIG. 4, in the discharging state of the cathode active material according to an embodiment, the second crystal phase is reduced and the first crystal phase is formed. Specifically, in the discharging state of the cathode active material, a reaction in which the bonding between the manganese (Mn) in the manganese-based metal oxide and the oxygen (O) in the crystal water is broken predominantly proceeds. As the migrated manganese (Mn) becomes to be thermodynamically stable again, the migrated manganese (Mn) is bonded with the oxygen constituting the unit layer to form the two-dimensional layered crystal structure. Therefore, as the discharging progresses, the content of the first crystal phase in the cathode active material gradually increases.

As such, in the cathode active material according to an embodiment, the first crystal phase, which is the thermodynamically stable phase, and the second crystal phase, which is the thermodynamically metastable phase, have the mutually reversible phase transition relationship, so that even when the charging/discharging is repeated, the excellent capacity characteristics close to the theoretical capacity and the excellent lifespan characteristics may be realized at the same time.

Hereinafter, a secondary battery containing a cathode active material prepared in the method for preparing the cathode active material according to an embodiment of the inventive concept will be described with reference to FIG. 5.

Figure 5:
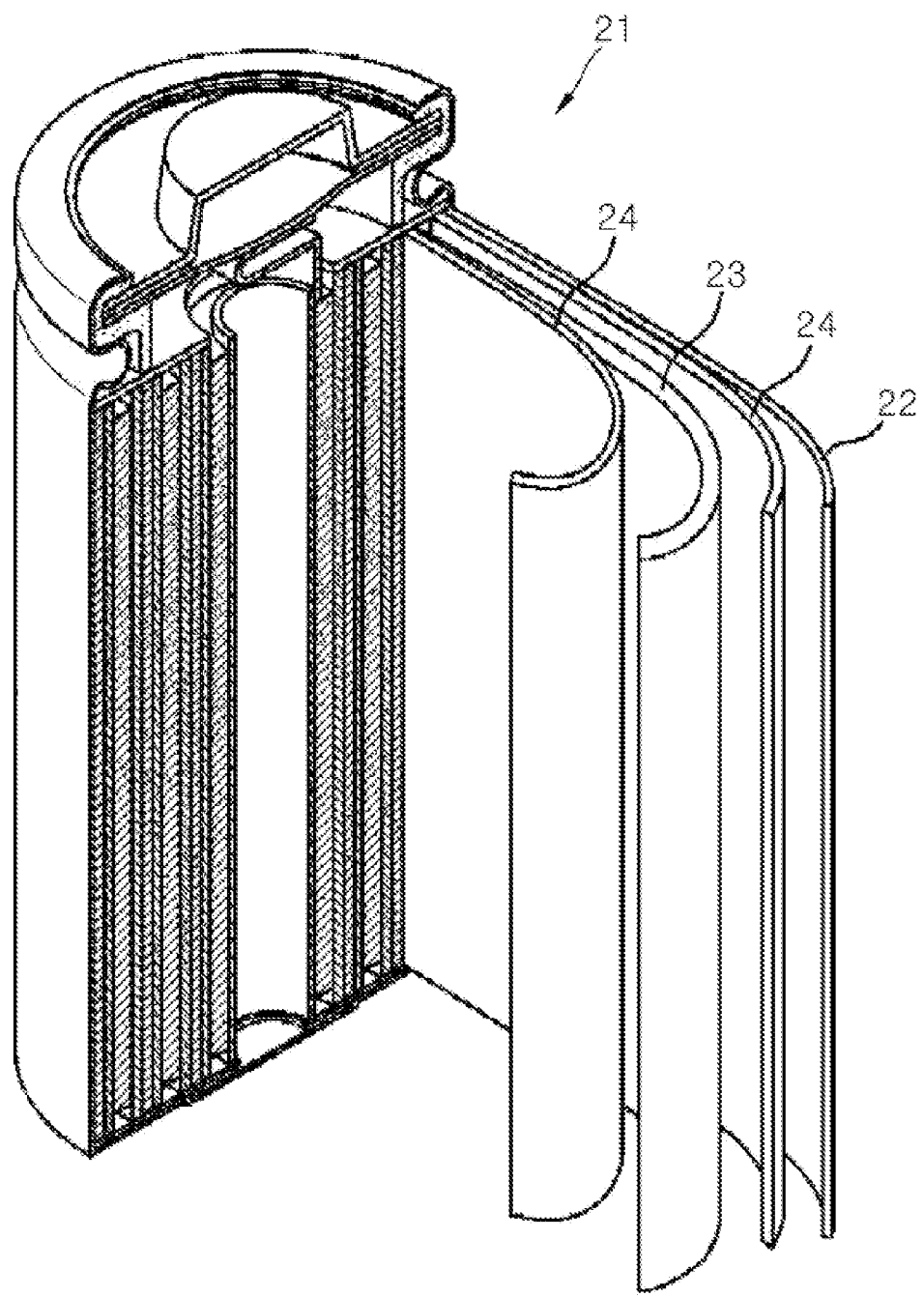
FIG. 5 is a view showing a secondary battery containing a cathode active material prepared in a method for preparing a cathode active material according to an embodiment of the inventive concept.

FIG. 5 is a view showing a secondary battery containing a cathode active material prepared in a method for preparing a cathode active material according to an embodiment of the inventive concept.

A secondary battery 21 according to FIG. 5 includes a cathode 23 containing the cathode active material according to an embodiment, an anode 22, and a separator 24 containing an electrolyte.

The cathode 23 and the anode 22 are manufactured by coating and drying a composition for preparing a cathode active material layer and a composition for preparing a cathode active material layer on a current collector, respectively.

The composition for preparing the cathode active material is prepared by mixing the cathode active material, a conductive agent, a binder, and a solvent with each other. As the cathode active material, the cathode active material according to the above-described embodiment is used.

In one example, the secondary battery 21 according to FIG. 5 merely relates to the secondary battery structure containing the cathode active material according to the inventive concept, and the inventive concept is not limited thereto. A specific implementation detail will be described later through a following implementation process.

Example

Sodium Manganese Oxide Synthesis Method 1: A sodium manganese oxide is obtained by adding 2.5 ml of $NaMnO_4$ as a manganese precursor to 40 ml of distilled water and performing the hydrothermal synthesis or the microwave synthesis at 220° C. for 6 hours.

After washing the obtained sodium manganese oxide with the distilled water three times, residual moisture remaining on a surface is removed by drying the sodium manganese oxide at about 60° C. under vacuum for 24 hours.

Sodium Manganese Oxide Synthesis Method 2: 8 mmol of $MnSO_4 \cdot H_2O$ as the manganese precursor is put into 2525 ml of the distilled water together with 8 mmol of EDTA (Ethylenediamine tetraacetic acid) disodium salt and mixed. 1.2M NaOH aqueous solution is added to the mixed solution at a rate of 33 mL for each minute. After stirring the mixed solution for about 1 hour, the manganese-based oxide is obtained. After washing the obtained material with the distilled water three times, the residual moisture remaining on the surface is removed by drying the obtained material under the vacuum at about 60° C. for 24 hours.

Lithium Manganese Oxide Synthesis Method 1: The lithium manganese oxide is synthesized by reacting the sodium manganese oxide synthesized using the above synthesis method with the aqueous lithium precursor solution to induce the ion-exchange between the sodium and the lithium.

Lithium Manganese Oxide Synthesis Method 2: In the above synthesis method, the lithium manganese oxide is directly synthesized by adding the lithium precursor during the oxidation/reduction of the manganese precursor.

The cathode active material of Example prepared through the above process has a composition expressed as $Li_{0.48}MnO_2 \cdot 30H_2O$.

Comparative Example

Thereafter, the dried lithium-manganese-based layered structure oxide is heat-treated at 120° C. for 5 hours. The heat treatment process, which is a process of specifically adjusting an internal crystal water content, has a possibility of degrading electrochemical activity of the cathode active material by a lithium (Li) element depending on the internal crystal water content.

In addition, in the heat treatment process, when the heat treatment temperature exceeds 300° C., there is a fear that impurities are generated. As a result, there is a fear that the electrochemical activity of the cathode active material may be degraded.

In one example, when the heat treatment time exceeds 12 hours, there is a fear that coarsening of particles may proceed or a porous structure may collapse, and the electrochemical activity of the cathode active material by the lithium may be degraded.

In Comparative Example, the cathode active material is prepared by performing the heat treatment by controlling the heat treatment temperature to 120° C. and the heat treatment time to 5 hours. The cathode active material of Comparative Example prepared through the heat treatment has a composition expressed as $Li_{0.48}MnO_2 \cdot 0.04H_2O$.

Electrode and Battery Manufacturing

[Electrode Manufacturing]

The composition for preparing the cathode active material is prepared by mixing the cathode active material, the conductive agent, the binder, and the solvent with each other. As the cathode active material, the cathode active material according to the above-described embodiment is used.

The binder, which is a component that assists in bonding of the active material and the conductive agent and bonding to the current collector, is added in an amount of 1 to 50 parts by weight based on 100 parts by weight of a total weight of the cathode active material. Non-limiting examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ether polymer (EPDM), sulfonated EPDM, styrene butadiene rubber, fluororubber, various copolymers, and the like. A content thereof is 2 to 5 parts by weight based on 100 parts by weight of the total weight of the cathode active material. When the binder content is within the above range, a binding force of the active material layer to the current collector is good.

The conductive agent is not particularly limited as long as it has conductivity without causing a chemical change in the battery. For example, graphite such as natural graphite, artificial graphite, and the like, a carbon-based material such as carbon black, acetylene black, ketjen black, channel black, furnace black, lamp black, summer black, and the like, a conductive fiber such as a carbon fiber, a metal fiber, and the like, a carbon fluoride, a metal powder such as an aluminum powder, a nickel powder, and the like, a conductive whiskey such as a zinc oxide, a potassium titanate, and the like, a conductive metal oxide such as a titanium oxide and the like, a conductive material such as a polyphenylene derivative and the like may be used.

A content of the conductive agent is 1 to 10 parts by weight based on 100 parts by weight of the total weight of the cathode active material. When the content of the conductive agent is within the above range, a conductivity characteristic of the finally obtained electrode is excellent.

As a non-limiting example of the solvent, N-methylpyrrolidone and the like are used.

A content of the solvent is 1 to 10 parts by weight based on 100 parts by weight of the cathode active material. When the content of solvent is within the above range, a work for forming the active material layer becomes easy.

The cathode current collector has a thickness in a range from 3 to 500 µm, and is not particularly limited as long as it has high conductivity without causing the chemical change in the battery. For example, stainless steel, aluminum, nickel, titanium, heat-treated carbon, or aluminum or stainless steel subjected to a surface treatment with carbon, nickel, titanium, silver, and the like may be used. The current collector may increase an adhesion of the cathode active material by forming fine irregularities on a surface thereof, and may be in various forms, such as a film, a sheet, a foil, a net, a porous body, a foam, a nonwoven body, and the like.

In the present experiment, to manufacture the cathode, on an Al current collector, the cathode active material: the conductive agent: the binder are mixed with each other in a weight ratio of 8:1:1, and subjected to a heat treatment in a vacuum oven at 70° C. for 5 hours.

[Battery Manufacturing]

The 2032 coin type Li half cell is manufactured in the glove box.

The electrolyte according to an embodiment may be a non-aqueous electrolyte. In one embodiment, the non-aqueous electrolyte may be a metal salt-containing non-aqueous electrolyte.

The metal salt-containing non-aqueous electrolyte is composed of the non-aqueous electrolyte and the metal salt. As the non-aqueous electrolyte, a non-aqueous electrolyte, an organic solid electrolyte, an inorganic solid electrolyte, and the like are used. As a metal constituting the metal salt, at least one element selected from the alkali metal and the alkaline earth metal may be used. In one embodiment, the metal salt may be one selected from a lithium salt, a sodium salt, a magnesium salt, a potassium salt, and a calcium salt. In one embodiment, the metal salt may be one selected from the lithium salt and the sodium salt.

As the non-aqueous electrolyte, as non-limiting examples, N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, formamide, N,N-dimethylformamide, dioxolane, acetonitrile, nitromethane, methyl formate, methyl acetate, triester phosphate, trimethoxymethane, a dioxolane derivative, sulfolane, methyl sulfolane, 1,3-dimethyl-2-imidazole ridinone, a propylene carbonate derivative, a tetrahydrofuran derivative, and an aprotic organic solvent such as ether, methyl pyropionate, and ethyl propionate may be used.

As the organic solid electrolyte, as non-limiting examples, a polyethylene derivative, a polyethylene oxide derivative, a polypropylene oxide derivative, a phosphoric acid ester polymer, polyester sulfide, polyvinyl alcohol, polyvinylidene fluoride, and the like may be used.

As the inorganic solid electrolyte, as non-limiting examples, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like may be used.

When the lithium salt is used as the metal salt, as a material that is good to dissolve in the non-aqueous electrolyte, as non-limiting examples, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenyl borate, imide, and the like may be used.

In the present experiment, 1M $LiPF_6$ in EC/DEC electrolyte was used.

Hereinafter, with reference to FIGS. 6 to 10, characteristics of the cathode active material and the secondary battery containing the cathode active material according to Example of the inventive concept will be described.

[Analysis Result]

Evaluation 1: Whether Crystal Water is Contained in Cathode Active Material

Figure 6:
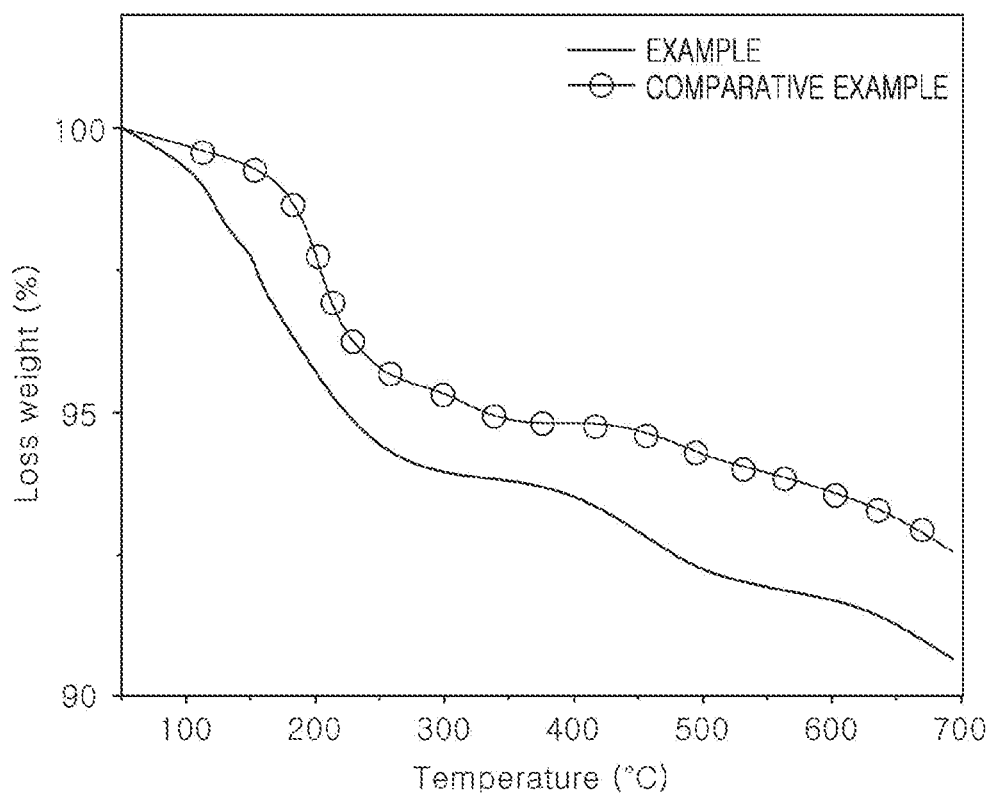
FIG. 6 is a graph showing results of thermogravimetric analysis of cathode active materials according to Example and Comparative Example of the inventive concept.

A weight change of each of the cathode active materials according to Example and Comparative Example is measured using thermogravimetric analysis while raising the temperature from a room temperature to 700° C., and then, a measurement result is shown in FIG. 6.

In this connection, in Comparative Example, the cathode active material according to Comparative Example is prepared through the same process as Example except for adding the heat treatment process after drying the manganese-based oxide.

FIG. 6 is a graph showing results of thermogravimetric analysis of cathode active materials according to Example and Comparative Example of the inventive concept. Referring to FIG. 6, it may be seen that Example shows a weight reduction of about 5.57 wt % from the room temperature to 170° C., whereas Comparative Example shows a weight reduction of about 0.87 wt % under the same conditions.

From the results of FIG. 6, it may be seen that more crystal water remains in the cathode active material according to Example than that according to Comparative Example.

That is, from the results of FIG. 6, it may be seen that, in the cathode active material according to Comparative Example, the crystal water is removed by further performing the heat treatment compared to Example.

Figure 7:
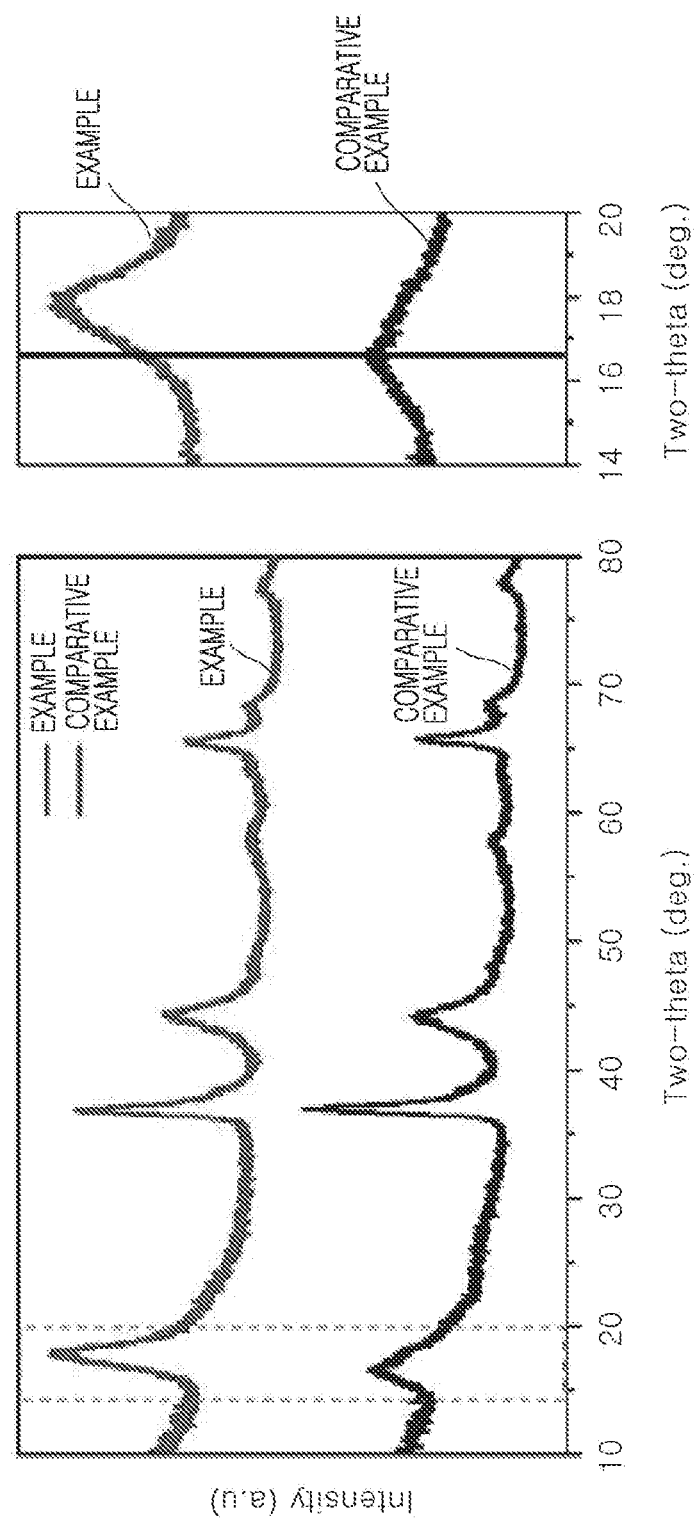
FIG. 7 is a graph showing results of X-ray diffraction analysis of cathode active materials according to Example and Comparative Example of the inventive concept.

In addition, FIG. 7 is a graph showing results of X-ray diffraction analysis of cathode active materials according to Example and Comparative Example of the inventive concept.

Referring to FIG. 7 together, it was identified that a peak in a vicinity of 17° indicating an interlayer distance was shifted to a higher angle in Comparative Example that has performed the heat treatment.

From the results of FIG. 7, it may be seen that the interlayer distances of the two materials become different because of the difference in the amounts of crystal water remaining in Example and Comparative Example.

Evaluation 2: Structural Change Based on Charging and Discharging of Cathode Active Material After obtaining a Raman spectrum for the cathode active material according to Example using Raman spectroscopy, the obtained result is shown in FIG. 7.

Figure 8:
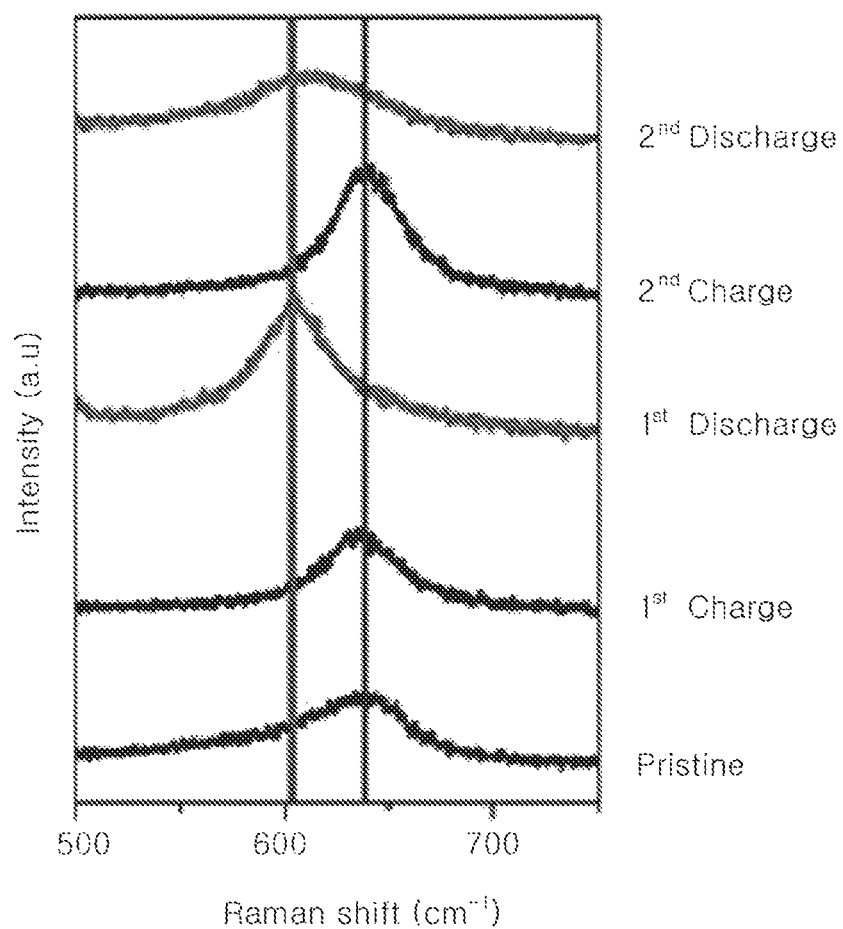
FIG. 8 is a graph showing a Raman spectrum of a cathode active material according to Example of the inventive concept.

FIG. 8 is a graph showing a Raman spectrum of a cathode active material according to Example of the inventive concept.

Referring to FIG. 8, in spectra of a pristine and a charging electrode of Example, a peak at about 650 $cm^{-1}$ region is observed, which means formation of a spinel-like phase that appears when Mn undergoes tetracoordinate and hexacoordinate coordination. On the other hand, in the discharging process, a peak is observed around 590 $cm^{-1}$, which indicates a layered phase in which Mn is hexacoordinated.

From the result of FIG. 8, it may be seen that, in the cathode active material according to Example, the first crystal phase, which is the thermodynamically stable phase, and the second crystal phase, which is the thermodynamically metastable phase, have the mutually reversible phase transition relationship based on the charging/discharging. That is, even when the charging/discharging is repeated, the excellent capacity characteristics close to the theoretical capacity and the excellent lifespan characteristics may be realized at the same time.

Evaluation 3: Electrochemical Characteristics of Cathode Active Material

As described above, the charging/discharging was performed once at a current density of 0.1 C in a voltage range from 1.5 V to 4.8 V with respect to manufactured half cells (Li half cells). A result thereof is shown in FIG. 9.

Figure 9:
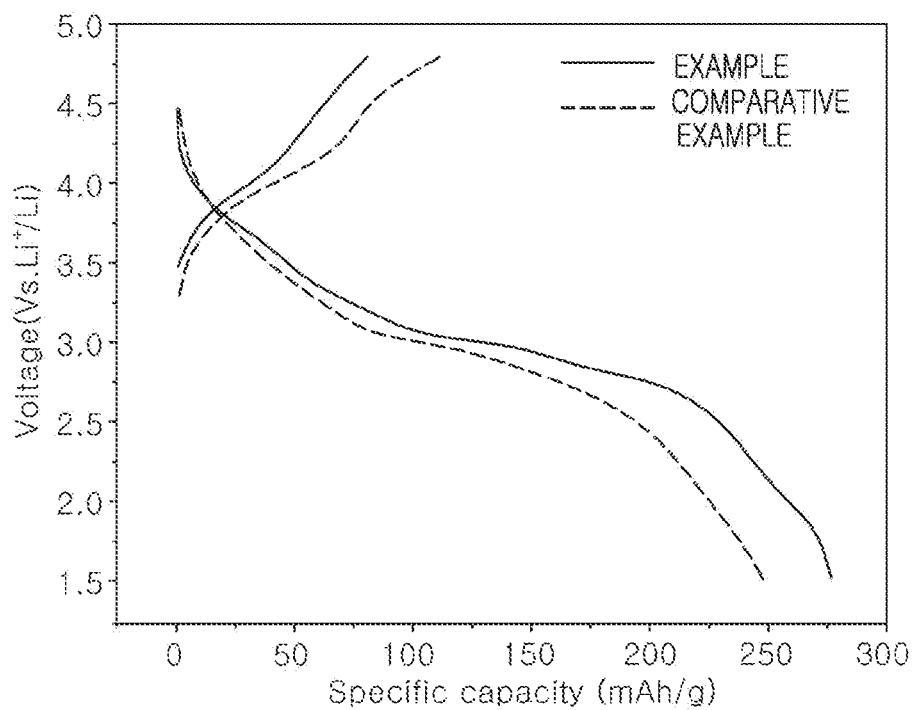
FIG. 9 is a graph showing characteristics of 1st time charging/discharging of secondary batteries containing cathode active materials according to Example and Comparative Example of the inventive concept.

FIG. 9 is a graph showing characteristics of 1st time charging/discharging of secondary batteries containing cathode active materials according to Example and Comparative Example of the inventive concept.

Referring to FIG. 9, both the cathode active materials according to Example and Comparative Example exhibited a capacity of about 80 to 100 mAh/g at a time of first charging. In one example, it may be seen that, when performing first discharging, the cathode active material according to Example exhibited a capacity of about 275 mAh/g, and the cathode active material according to Comparative Example exhibited a capacity of about 250 mAh/g.

In addition, 20 times of charging/discharging were performed at the current density of 0.1 C in the voltage range from 1.5 V to 4.8 V with respect to the manufactured half-cells. A result thereof is shown in FIG. 10.

Figure 10:
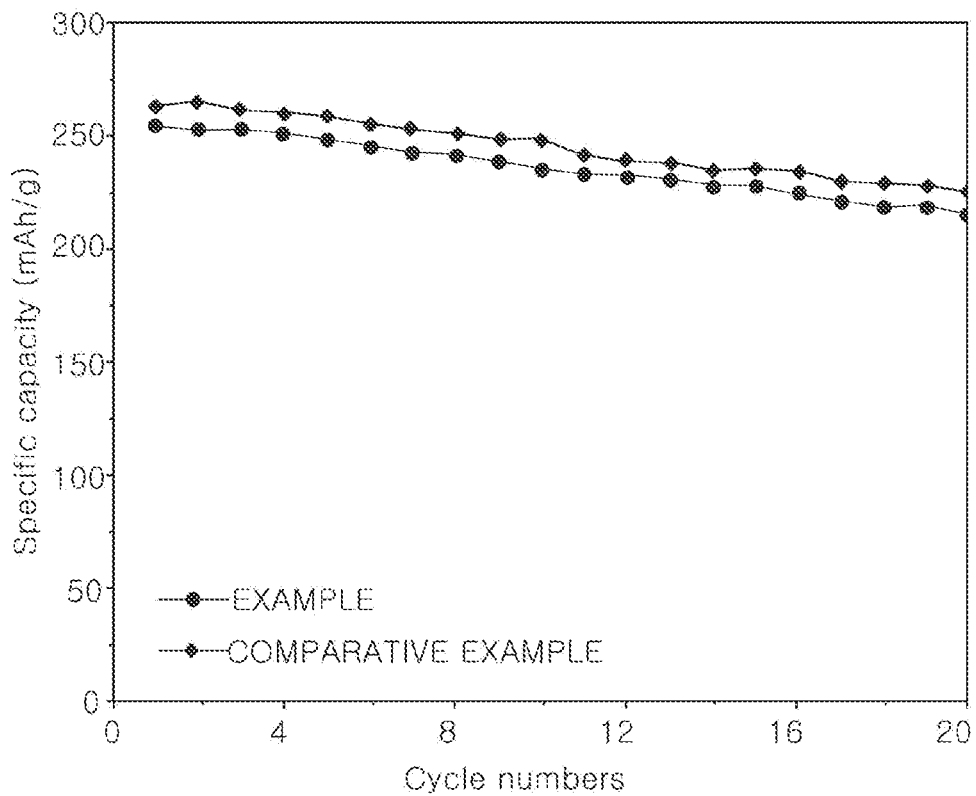
FIG. 10 is a graph showing cycle capacity characteristics of secondary batteries containing cathode active materials according to Example and Comparative Example of the inventive concept.

FIG. 10 is a graph showing cycle capacity characteristics of secondary batteries containing cathode active materials according to Example and Comparative Example of the inventive concept.

In addition, referring to FIG. 10, based on the 20th time, Example exhibits a discharging capacity of about 225 mAh/g, and Comparative Example exhibits a discharging capacity of about 218 mAh/g. In addition, Example represents a capacity retention rate of 81% compared to the 1st time. As shown in FIGS. 9 and 10, it may be seen that the cathode active material according to Example exhibits the excellent capacity characteristics compared to Comparative Example.

The above detailed description exemplifies the inventive concept. In addition, the above-mentioned content is to describe a preferred embodiment of the inventive concept, and the inventive concept is able to be used in various other combinations, modifications, and environments. That is, changes or modifications are possible within the scope of the concept of the inventive concept disclosed herein, the scope equivalent to the written disclosure, and/or within the scope of skill or knowledge in the art. The written embodiment is to describe the best state for implementing the technical idea of the inventive concept, and various changes thereof required in specific application fields and uses of the inventive concept are also possible. Therefore, the above detailed description of the inventive concept is not intended to limit the inventive concept to the disclosed embodiment. The appended claims should also be construed to include other embodiments as well.

According to embodiments of the inventive concept, it is possible to exhibit the excellent capacity and lifespan characteristics by making the structural change that appears during the charging/discharging to be reversible.

In one example, effects that may be obtained from the inventive concept are not limited to the above-mentioned effects. Other effects not mentioned will be clearly understood by those of ordinary skill in the art to which the inventive concept belongs from a following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for preparing a cathode active material, the method comprising:
    (A) synthesizing a sodium manganese oxide using a manganese precursor; and
    (B) reacting the sodium manganese oxide with a lithium precursor to synthesize a lithium manganese oxide,
    wherein, the manganese precursor is formed as a Mn (II) precursor,
    the step (A) comprises:
    synthesizing the sodium manganese oxide by mixing the manganese precursor, an ethylenediamine tetraacetic acid (EDTA) disodium salt, and distilled water with each other to form a mixture, and then adding a NaOH aqueous solution to the mixture.

2. The method of claim 1, wherein the step (B) comprises:
    preparing the lithium manganese oxide by performing ion-exchange between sodium and lithium of the sodium manganese oxide in an aqueous lithium precursor solution.

3. The method of claim 1, wherein the lithium manganese oxide prepared in the step (B) is expressed by a following [Chemical Formula 1], $$Li_xMnO_2 \cdot yH_2O \quad \text{[Chemical Formula 1]}$$

wherein, $0.23 \leq x \leq 1$, and $0.01 \leq y \leq 0.5$.

4. The method of claim 1, wherein the cathode active material comprising the lithium manganese oxide exhibits a reversible phase transition during charging/discharging.

* * * * *